US012698053B2

(12) United States Patent
Duscheleit et al.

(10) Patent No.: US 12,698,053 B2
(45) Date of Patent: Aug. 4, 2026

(54) WHEEL COMPONENT FOR AN AT LEAST PARTIALLY MUSCLE-POWERED BICYCLE AND METHOD OF MANUFACTURING A BRAKE ARRANGEMENT

(71) Applicant: TRICKSTUFF GMBH, Pfaffenweiler (DE)

(72) Inventors: Moritz Duscheleit, Freiburg (DE); Christoph Schedel, Freiburg (DE)

(73) Assignee: TRICKSTUFF GMBH, Pfaffenweiler (DE)

( * ) Notice: Subject to any disclaimer, the term of this patent is extended or adjusted under 35 U.S.C. 154(b) by 377 days.

(21) Appl. No.: 18/452,261

(22) Filed: Aug. 18, 2023

(65) Prior Publication Data

US 2024/0059371 A1     Feb. 22, 2024

(30) Foreign Application Priority Data

Aug. 22, 2022     (DE) .......................... 102022121164.9

(51) Int. Cl.
B62L 3/02 (2006.01)

(52) U.S. Cl.
CPC .................................... B62L 3/023 (2013.01)

(58) Field of Classification Search
CPC ................................................ B62L 3/02–023
See application file for complete search history.

(56) References Cited

U.S. PATENT DOCUMENTS

| | | | |
|---|---|---|---|
| 7,578,375 B2 | 8/2009 | Lin et al. | |
| 9,963,192 B2 | 5/2018 | Watarai et al. | |
| 10,232,905 B2 | 3/2019 | Miki et al. | |
| 10,589,819 B2 | 3/2020 | Komada et al. | |
| 2010/0051400 A1* | 3/2010 | Yang ....................... | B60T 11/16 188/344 |
| 2012/0152673 A1 | 6/2012 | Wang | |

FOREIGN PATENT DOCUMENTS

| | | | |
|---|---|---|---|
| DE | 202017001931 U1 | 10/2017 | |
| DE | 202017001935 U1 | 10/2017 | |
| DE | 102020128142 A1 | 4/2022 | |
| FR | 3115758 A3 * | 5/2022 | .............. B60T 11/16 |
| WO | 99/10225 A2 | 3/1999 | |

OTHER PUBLICATIONS

Search Report received for German Application No. 10 2022 121 164.9, dated May 2, 2023.

* cited by examiner

*Primary Examiner* — David R Morris

(74) *Attorney, Agent, or Firm* — Greer, Burns & Crain, Ltd

(57)     ABSTRACT

A hydraulic brake arrangement for a bicycle with a transmitting unit with a brake lever, and a cylinder housing with a cylinder space, and with a piston unit displaceably received in the cylinder space. The brake lever is operatively coupled with the piston unit by means of an actuating mechanism. The cylinder housing comprises a lever-side end and a receiver-side end. On the receiver-side end, a connection port is configured for coupling a conduction device. On the lever-side end, a connecting opening is configured, through which the actuating mechanism extends into the cylinder space to the piston unit. The connecting opening is configured in a supporting wall extending transverse to the longitudinal axis of the cylinder space and non-detachably connected with the cylinder housing. The piston unit is inserted into the cylinder space through the connection port.

28 Claims, 6 Drawing Sheets

WHEEL COMPONENT FOR AN AT LEAST PARTIALLY MUSCLE-POWERED BICYCLE AND METHOD OF MANUFACTURING A BRAKE ARRANGEMENT

BACKGROUND

The present invention relates to a hydraulic brake arrangement for an at least partially muscle-powered bicycle and comprises at least one transmitting unit, wherein a fluid connection can be established with a receiving unit. The transmitting unit comprises a brake lever and a cylinder housing with a cylinder space, and a piston unit displaceably accommodated in the cylinder space.

Hydraulic disk brakes for bicycles offer safe braking, including in fast rides and for example in sports cycling, for racing bicycles or mountain bikes. Moreover, safe braking is also provided for electric bicycles or city bikes.

Hydraulic bicycle brakes can as a rule generate high braking momenta. It is therefore important for the transmitting unit to allow highly sensitive actuation to optimally modulate the braking action and to avoid undesired locking of the wheels.

The so-called dead travel plays a decisive role for the responsivity of the bicycle brake. The dead travel corresponds to the travel which the piston unit must cover in the cylinder space until the brake first builds up pressure. The shortest possible dead travel is desired, in particular, in sports bicycles such that the brake responds the fastest possible, and immediately as the brake lever is pulled. Thus, precise modulation of the braking power over a particularly short actuation travel must be possible.

However, in view of operational safety and durability of the bicycle brake, a too short dead travel is a drawback. It has been shown that a too short dead travel may result in increased wear, or in specific load conditions, even in destruction of the piston sealing.

Therefore, the tolerances ensuing for any and all components which might inadvertently decrease, or increase, the dead travel, are extremely narrow. At the same time, these narrow tolerances must not significantly increase even during operation of the bicycle brake, which tends to be hard (for example on a mountain bike). Namely, the braking power may otherwise no longer offer reliable modulation, and falls may result.

Generally, in terms of construction, there are high requirements on the precision of the individual components. As a rule, the result is a complicated structural arrangement of the transmitting unit. These structures then show to be susceptible to failure and tend to involve very high maintenance requirements. However, specifically in sports bicycles, the reliability and the ability of fast maintenance work play a decisive role. Moreover, complicated structures also result in increased costs. Supplementarily, the requirements indicated above should include brakes of a very low weight to not unnecessarily increase the total weight of the bicycle.

In view of this, it is the object of the present invention to provide an improved hydraulic brake arrangement, which fulfills as far as possible the requirements discussed above.

SUMMARY

The hydraulic brake arrangement according to the invention is provided for an at least partially muscle-powered bicycle. The brake arrangement comprises at least one transmitting unit provided for fluid connection with a receiving unit. The brake arrangement may comprise at least one receiving unit. The transmitting unit comprises a brake lever and a cylinder housing with a cylinder space. The transmitting unit comprises a piston unit displaceably accommodated in the cylinder space. The brake lever is operatively coupled with the piston unit by means of an actuating mechanism. The actuating mechanism, in particular, presses on the piston unit when the brake lever is actuated. The brake lever is, in particular, (at least in one direction of force) coupled to the piston unit. In particular, such that the piston unit is displaceable in the cylinder space by way of actuating the brake lever. The cylinder housing has a lever-side end and a receiver-side end. The receiver-side end has a connection port configured (in the cylinder housing) for coupling a conduction device (provided for fluid connection with the receiving unit). The lever-side end is configured with a connecting opening through which the actuating mechanism extends into the cylinder space to the piston unit. The connecting opening is configured in a supporting wall extending transverse to the longitudinal axis of the cylinder space. The piston unit can (only) be inserted into the cylinder space through the connection port (for example in the scope of mounting the brake arrangement). In other words, the piston unit is mountable into the cylinder space through the connection port. In particular, the piston unit is provided to be inserted into the cylinder space through the connection port.

The brake arrangement according to the invention offers many advantages.

The supporting wall is connected with the cylinder housing, in particular, non-detachably, and preferably integrally. Then it is a considerable advantage for the connecting opening to be disposed in a supporting wall configured integrally with the cylinder housing. This fulfills the requirements discussed above particularly reliably, while also with particularly little structural complexity. Such a supporting wall can for example achieve particularly narrow tolerances for the dead travel. At the same time, considerable improvement of stability is achieved for example when, in a fall, the brake lever is pulled in a direction opposite the intended, normal direction of actuation. In particular, the supporting wall and the cylinder housing consist of one combined (continuous) material structure. Integral may, in particular, be referred to as one single material.

In all the configurations, installation of the piston unit through the connection port respectively from the front, also offers considerable advantages. Thus, in combination with the fixed supporting wall, particular ease of mounting the transmitting unit is possible. At the same time, a complex structure of the piston respectively the cylinder housing involving multiple components can be dispensed with. For example, the circlip which is otherwise used as a rule for securing the piston in the hole, can be dispensed with. Moreover, servicing the transmitting unit is thus particularly easy. With the invention, for example exchanging the piston and seals can be done within a few minutes or even in less than 1 minute. Another advantage of the connection port is that it enables highly precise while also uncomplicated manufacturing respectively finishing the supporting wall.

The supporting wall, in particular, limits the movability of the piston unit on the lever-side end. The supporting wall, in particular, defines a rest position of the piston unit. The supporting wall, in particular, provides an abutment for the piston unit in the rest position. The piston unit, in particular, rests (preferably indirectly via the connecting rod device and, in particular, the connecting rod small end) against the supporting wall when the piston unit has reached the lever-side end of its movability respectively actuation travel. The rest position is, in particular, defined in that the piston unit rests against the supporting wall. The transmitting unit is, in particular, not actuated in the rest position. The supporting wall, in particular, limits the cylinder space at the lever-side end. The supporting wall, in particular, completely closes the cylinder space at the lever-side end outside of the connecting opening.

Preferably, the connection port has a minimum diameter which equals, or is larger than, the maximum diameter of the cross sectional geometry of the piston unit. The cross sectional geometry, in particular, relates to a cross section of the piston unit transverse to its longitudinal axis. The diameters are, in particular, matched to one another such that the piston unit can be inserted into the cylinder housing through the connection port. The minimum diameter may also be referred to as the clear width of the connection port. The connection port, in particular, has a minimum diameter which equals, or is larger than, the minimum diameter of the cylinder space. The connection port is, in particular, manufactured by means of material removal from the cylinder housing.

The connection port is preferably provided with at least one chamfer. Preferably, the chamfer is suitable and configured to protect, and, in particular, compress when pushing the piston unit into the connection port, a piston sealing device mounted to the piston. In particular, is the chamfer disposed on a receiver-side end of the cylinder space. For example, the chamfer is located on the receiver-side end of a raceway for the piston unit (so-called cylinder raceway). The chamfer is, in particular, disposed in a transition from a first to a second diameter of the connection port, wherein the first diameter is smaller than the second diameter. In particular, is the first diameter the minimum diameter of the connection port, and preferably corresponds to the diameter of the cylinder space. In particular, is the chamfer configured integrally with the cylinder housing.

Preferably, the connecting opening has a minimum diameter which is smaller than the maximum diameter of the cross sectional geometry of the piston unit. Thus, the piston unit can, in particular, not pass through the connecting opening. The piston unit can, in particular, not be inserted into the cylinder housing through the connecting opening. The piston unit can, in particular, only be inserted into the cylinder space through the connection port.

Preferably, the connecting opening has a minimum diameter which is smaller than the maximum diameter of the cross sectional geometry of a part of the actuating mechanism lying inside of the cylinder housing. Thus, the actuating mechanism can, in particular, not be entirely removed from the cylinder housing through the connecting opening. The actuating mechanism can, in particular, only be inserted into the cylinder housing through the connection port. The minimum diameter of the connecting opening is, in particular, smaller than the clear width of the cylinder housing respectively than the diameter of the cylinder space.

The actuating mechanism comprises, in particular, at least one connecting rod device with a connecting rod and a connecting rod small end. In particular, is the connecting rod small end firmly connected with the connecting rod. In particular, is the connecting rod device configured as one piece. In particular, is the piston unit operatively coupled with the brake lever through the actuating mechanism, such that the piston unit is displaced in the cylinder space as the transmitting unit is actuated. The transmitting unit is, in particular, actuated at the brake lever.

The connecting opening, in particular, shows a minimum diameter which is narrower than the maximum diameter of the cross sectional geometry of the connecting rod device and preferably of the connecting rod small end. The maximum diameter of the connecting rod is, in particular, narrower than the minimum diameter of the connecting opening. The connecting rod provides, in particular, that part of the actuating mechanism which extends through the connecting opening into the cylinder space. The connecting rod small end is, in particular, disposed entirely in the cylinder space. It is also possible for the connecting rod small end to be provided for passing through the connecting opening.

Preferably, the piston unit is radially enclosed in the cylinder housing over its entire axial length. The cylinder housing, in particular, radially encloses the piston unit along the entire actuation travel.

In a particularly advantageous and preferred embodiment, the cylinder housing is integrally connected with a lever accommodation. The brake lever is, in particular, supported on the lever accommodation for pivoting (around a brake lever pivot axis). This type of cylinder housing structure shows particularly well the advantages of the supporting wall integrally connected with the cylinder housing. As will be described in more detail below, the cylinder housing and the lever accommodation are preferably incorporated in the base body.

In all the configurations it is particularly advantageous and preferred for the cylinder housing to be an integral component of the base body of the transmitting unit. In particular, is the cylinder housing integrally connected with the base body. A cylinder wall radially enclosing the cylinder space is, in particular, integrally connected with the base body. This results in many advantages regarding the tolerances for the dead travel and for maintenance, and for the stability of the transmitting unit. The cylinder housing is, in particular, configured integrally. In the scope of the present invention, an integral component is, in particular, understood to mean that the component is fixedly, non-detachably linked, and, in particular, by means of a continuous (uniform) material structure.

The cylinder space is preferably provided by at least one recess in the base body. The cylinder space is, in particular, manufactured by material removal from the base body. The cylinder space is, in particular, configured as an elongated (preferably cylindrical) space, and preferably as a bore or hole. In the scope of the present invention, a hole may be manufactured by means of boring or other suitable processes, and for example by milling or the like. It is possible and advantageous to provide for at least one further, subsequent process step, e.g. honing, polishing, grinding and/or anodizing, or another coating method.

Preferably, at least one equalizing hole is disposed in the cylinder housing. The equalizing hole is, in particular, disposed in a cylinder wall. The equalizing hole may also be referred to as snifter hole. The equalizing hole, in particular, connects the cylinder space (in particular, a pressure space forming part of the cylinder space) with the tank space of an equalizing reservoir device. The equalizing hole is, in particular, understood to mean a channel-type through hole, which does not need to be manufactured by boring or drilling. In the scope of the present invention, the terms "equalizing hole" and "duct-type through hole" may preferably be used as synonyms.

In all the configurations it is particularly preferred for a distance to be fixedly (unchangeably) incorporated into the material of the cylinder housing, between the equalizing hole and the supporting wall. Preferably, the distance is fixedly incorporated into the material of the base body. The distance can, in particular, not be changed due to exchanging components. Such a structural integration of the equalizing hole and the supporting wall into the cylinder housing respectively the base body offers many advantages. Thus, undesired changes of the distance for example due to the tolerances of components (for example retaining rings, disks etc.) or due to manufacturing tolerances (e.g. milling grooves for retaining rings) are reliably prevented. At the same time, this allows particularly uncomplicated observing of distances. For example the distance can be specified directly during manufacturing, and for example in chip removal from the base body, permanently and independently of subsequent tolerances. Since such distance is decisive for the dead travel, the dead travel can likewise be specified at particularly narrow tolerances. The dead travel is, in particular, not adjustable.

The connecting rod preferably extends through the connecting opening into the cylinder space. The connecting rod small end is, in particular, disposed in the cylinder space between the supporting wall and the piston unit. Such a connecting rod device in combination with the supporting wall allows particular reliability when specifying the dead travel. Moreover, any undesired play is effectively prevented to be noticed at the brake lever when it is actuated from the rest position. Alternately it is possible for the piston unit to directly bear against the supporting wall and to specify the dead travel in this way.

The connecting rod small end shows, in particular, a cross sectional geometry whose maximum diameter is larger than the minimum diameter of the connecting opening. The connecting rod small end is, in particular, larger than the connecting opening. The connecting rod small end can, in particular, only be inserted into the cylinder space through the connection port. The connecting opening, in particular, shows a minimum diameter which is equal to, or larger than, the maximum diameter of the cross sectional geometry of the connecting rod.

It is preferred and advantageous for the supporting wall to have a contact portion that geometrically corresponds with the connecting rod small end. Preferably, the contact portion is configured concave. Preferably the connecting rod small end is, at least in sections, configured convex and particularly preferably, spherical. The contact portion, in particular, represents at least approximately, a negative shape of the connecting rod small end. The contact portion lies, in particular, on the side of the supporting wall facing cylinder space. This allows a particularly precise specification of the dead travel. The connecting rod small end in particular bears against the contact portion in immediate contact. There are, in particular, not provided any other components between the connecting rod small end and the contact portion.

The piston unit can, in particular, be biased to a rest position by means of at least one biasing member. Preferably, the biasing member urges the connecting rod small end against the supporting wall and, in particular, against the contact portion. This establishes a highly precise and also uncomplicated specification of the rest position. This is for example considerably more advantageous than using cir-clips which are inserted in suitable grooves. Namely, both a circlip and a groove may lead to undesired tolerances. Moreover, the invention advantageously achieves a sealing effect between the connecting rod small end and the contact portion.

The biasing member, in particular, returns the piston unit from an actuated position to the rest position. The biasing member, in particular, comprises, or is configured as, a spring. The biasing member, in particular, urges the piston unit in the direction toward the lever-side end of the cylinder housing. The biasing member is, in particular, supported on a connecting unit which screws into the connection port. The biasing member can, in particular, be inserted into the cylinder space (only) through the connection port.

In an advantageous specific embodiment, the connecting rod is disposed outside of the cylinder space in a receiving space that is at least partially enclosed by the base body of the transmitting unit. The connecting rod in the receiving space is, in particular, coupled (in particular, by means of a cam body) to the brake lever (in at least one direction of force). The connecting rod extends, in particular, from the cylinder space through the connecting opening into the receiving space. The supporting wall is, in particular, disposed between the receiving space and the cylinder space.

In particular, is the receiving space configured in the base body. In particular, is the receiving space an integral component of the base body. Preferably, the receiving space is incorporated in the base body. In particular, is the receiving space provided by a recess in the base body. The receiving space is, in particular, manufactured by material removal from the base body. A vent opening, in particular, opens into the receiving space. The vent opening, in particular, serves for pressure compensation between the tank space of the equalizing reservoir device and atmosphere. The receiving space, in particular, has access to atmosphere. The receiving space is, in particular, configured partially open. The receiving space, in particular, comprises at least one opening through which the cam body extends to the brake lever, and/or through which the brake lever extends to the cam body, or through which the brake lever extends to the connecting rod device.

The brake lever is, in particular, pivotally supported around a brake lever pivot axis. The brake lever pivot axis is, in particular, disposed laterally adjacent an imaginary extension of the cylinder space. Thus, the connecting rod device, which extends out of the cylinder space into the receiving space, can particularly readily be connected with the remaining actuating mechanism and for example with the cam body or the brake lever, during mounting.

The actuating mechanism, in particular, comprises at least one cam body. The connecting rod device (with its connecting rod) is, in particular, pivotally linked to the cam body around the connecting rod pivot axis. The cam body is, in particular, pivotally linked to the lever accommodation by means of a cam pivot axis. In particular, the connecting rod device and the cam body are pivotable relative to one another. The brake lever pivot axis and the cam pivot axis are, in particular, identical. The brake lever and the cam body, in particular, have one shared point of support on the lever accommodation. The connecting rod pivot axis, in particular, extends through the cam body.

It is possible and advantageous for the cam body and the brake lever to be fixedly interconnected. Then, the cam body and the brake lever can, in particular, only be moved jointly. For example, the cam body and the brake lever may be integrally interconnected. The cam body and the brake lever may be configured as separate components. It is also possible and advantageous for the cam body and the brake lever to be movable relative to one another. Preferably, the cam body and the brake lever can then be pivoted around one shared pivot axis independently of one another.

It is preferred and advantageous for at least one sealing member to be disposed upstream of the connecting opening on its side facing away from the cylinder space. The connecting rod, in particular, extends through the sealing member. The sealing member is, in particular, configured as a sealing disk with a (central) opening. The sealing member preferably prevents dirt from penetrating through the connecting opening into the cylinder space.

The sealing member is, in particular, disposed spaced apart from the supporting wall. The sealing member is, in particular, disposed in the receiving space. The sealing member, in particular, remains stationary when the connecting rod moves. The sealing member is, in particular, fastened to the cylinder housing. The sealing member is, in particular, received in an annular groove. The annular groove is, in particular, manufactured by material removal from the cylinder housing.

In an advantageous specific embodiment, the connection port and the connecting opening and the cylinder space and the piston unit are disposed on one shared longitudinal axis. This allows a particularly compact, stable implementation of the invention.

The connection port can preferably be coupled with at least one connecting unit for coupling a conduction device. The connecting unit, in particular, screws into the cylinder housing. To this end, the cylinder housing is, in particular, provided with a screw thread on the receiver-side end. It is preferred and advantageous for the connection port to be narrowed only (solely) by the (screwed-in) connecting unit so that the piston unit can no longer exit out of the cylinder space through the connection port. This allows a particularly simple manufacturing respectively mounting and a structurally uncomplicated implementation of the invention. Thus, for example the raceway for the piston unit (so-called cylinder raceway) or cylinder space inner wall can be processed particularly easily combined with high precision, so that the responsivity of the brake is further improved on the whole.

The connecting unit, in particular, narrows the connection port with the portion with which it is screwed into the connection port. In particular, is the (screwed-in) connecting unit radially disposed inside of the cylinder housing at least in sections. The connecting unit and the cylinder housing are, in particular, coaxially disposed in sections. The connecting unit is, in particular, disposed radially inwardly and the cylinder housing, radially outwardly. Preferably, the connecting unit closes the connection port outwardly fluidtight.

It is possible and advantageous for the connecting unit to have a support structure on which the biasing member is supported. The support structure is, in particular, disposed on an inner face of the connecting unit. Between the connecting unit and the cylinder housing at least one seal is, in particular, disposed.

The method according to the invention manufactures a hydraulic brake arrangement for an at least partially muscle-powered bicycle. The brake arrangement manufactured comprises a transmitting unit which is provided for fluid connection with a receiving unit. The transmitting unit comprises a brake lever and a cylinder housing with a cylinder space, and a piston unit displaceably received in the cylinder space. The brake lever is operatively coupled with the piston unit by means of an actuating mechanism. The cylinder housing has a lever-side end and a receiver-side end. On the receiver-side end, a connection port for coupling a conduction device is configured. The lever-side end is configured with a connecting opening through which the actuating mechanism extends into the cylinder space to the piston unit. The piston unit is thus inserted into the cylinder space through the connection port.

The method according to the invention also solves the object indicated above particularly advantageously. The method is, in particular, configured for manufacturing the brake arrangement described above. The brake arrangement described above is, in particular, suitable and configured to be manufactured according to the method described above.

The piston unit is, in particular, preassembled and then inserted into the cylinder space. The piston unit comprises a piston and at least one piston sealing device mounted to the piston. In particular, at least one primary sealing and at least one secondary sealing are mounted to the piston. The connection port is preferably provided with at least one chamfer prior to inserting the piston unit. Manufacturing the chamfer may also be referred to as chamfering. Chamfering is, in particular, done by material removal from the cylinder housing at the receiver-side end.

Preferably, the connecting opening is manufactured by material removal from a supporting wall which extends transverse to the longitudinal axis of the cylinder space (and is non-detachably respectively integrally connected with the cylinder housing). The supporting wall described above is, in particular, manufactured thus. The connection port is, in particular, manufactured by means of material removal from the cylinder housing. The sequence of steps is, in particular, selected such that the contact surface can be processed with particular precision, so as to achieve exact dead travel.

In the scope of the present invention, the material removal is, in particular, carried out by a chip-removing process and for example by milling and/or drilling or the like. Other suitable abrasive processes are likewise possible. In all the configurations it is preferred for the material removal to be carried out from the base body. The base body is, in particular, manufactured by means of material removal from a base body blank.

Preferably, the connecting rod device with the connecting rod and the connecting rod small end is inserted through the connection port before the piston unit is. Preferably, the connecting rod thus inserted is removed back out of the cylinder space through the connecting opening. The connecting rod small end then remains, in particular, in the cylinder space. The connecting rod device is, in particular, inserted into the cylinder space through the connection port with the connecting rod first. The connecting rod is thereafter, in particular, connected with the remaining actuating mechanism and preferably with the cam body and/or brake lever outside of the cylinder space and preferably in the receiving space.

Preferably, the cylinder space is manufactured by means of material removal from the base body of the transmitting unit. It is preferred for the material to be removed from the receiver-side end in the direction to the lever-side end. The connection port is, in particular, manufactured by means of material removal from the base body. The material removal for the cylinder space is, in particular, carried out through the connection port.

Preferably, the contact portion is manufactured by means of material removal from the supporting wall. The material removal is, in particular, carried out from the receiver-side end through the connection port. To this end, a tool is, in particular, inserted into the cylinder space through the connection port. The contact portion is, in particular, shaped out geometrically corresponding to the connecting rod small end.

Preferably, a sealing groove is manufactured by means of material removal from the base body. In particular, the sealing groove described above is manufactured. Preferably, the material removal is carried out from outside of the cylinder space and, in particular, from the receiving space. At least one sealing member is inserted, in particular, into the sealing groove. The connecting rod is, in particular, guided through the sealing member. It is likewise possible for the sealing member to be pushed onto the connecting rod.

It is particularly preferred for the equalizing hole to be incorporated into the base body showing a defined distance from the contact portion of the supporting wall. For example, the equalizing hole is drilled and/or milled or the like. The equalizing hole is, in particular, manufactured transverse to the longitudinal axis of the cylinder space. This allows a highly exact and also uncomplicated specification of the dead travel. Further processing steps are possible, e.g. honing, polishing, grinding and/or anodizing, or another coating method.

The dead travel is, in particular, specified in that the equalizing hole is incorporated into the base body at a defined distance from the supporting wall. The dead travel is, in particular, the distance which the piston unit must travel to get from the rest position to a position in which the pressure space is first sealed against the tank space. The dead travel is, in particular, that distance which the piston unit must cover until the primary sealing closes the equalizing hole.

Preferably, the biasing member is inserted through the connection port. Preferably, the biasing member is clamped between the connecting unit and the piston unit. In particular, is the biasing member biased by screwing the connecting unit into the cylinder housing.

The piston unit and the cylinder housing, in particular, limit a pressure space (provided for fluid connection with the receiving unit). The pressure space represents, in particular, a part of the cylinder space. The at least one equalizing hole is disposed in the cylinder housing (in particular, in a cylinder wall of the cylinder housing). The at least one equalizing hole connects the pressure space with the fluid space (when the piston unit is in a rest position respectively when the transmitting unit is not actuated). In the case of actuation of the transmitting unit, the piston unit seals the pressure space, in particular, against the fluid space, such that pressure can be applied on the pressure space. In other words, actuating the transmitting unit allows the piston unit to close the equalizing hole. A subsequent further movement of the piston unit results, in particular, in a pressure buildup in the pressure space and in reduction of the pressure space volume. The transmitting unit is, in particular, actuated by (manually) moving respectively actuating the brake lever.

The equalizing hole may comprise, or be provided by, multiple single holes. The equalizing hole discussed in the scope of the present invention, in particular, relates to all the single holes. This applies in analogy, in particular, also to the lubrication hole. In the scope of the present invention, a hole is, in particular, understood to mean at least one elongated (channel-type) (through) hole.

The piston unit comprises, in particular, a piston (respectively piston body) and at least one piston sealing device. The piston is, in particular, configured integrally. Alternately, the piston may be structured multipart. In the scope of the present invention, the term "piston unit" is, in particular, used to mean the piston and the piston sealing device mounted thereto.

The piston sealing device comprises, in particular, at least one (first) piston sealing disposed circumferentially around the piston. The piston sealing, in particular, seals the piston against the cylinder housing. The piston sealing, in particular, seals the pressure space against the equalizing hole (when the piston unit is displaced in the cylinder space due to actuation). The piston sealing may also be referred to as a primary sealing.

The piston sealing device, in particular, comprises at least one further piston sealing. The further piston sealing may be referred to as a secondary sealing. The further piston sealing is, in particular, located outside of the pressure space. The further piston sealing is, in particular, spaced apart from the primary sealing. The further piston sealing is in particular located between the primary sealing and an end of the piston facing the supporting wall. The further piston sealing, in particular, seals the tank space against the connecting opening and preferably against the receiving space.

The base body, in particular, comprises at least the cylinder housing, the receiving space (or a receiving space housing), the tank trough of an equalizing reservoir device for hydraulic fluid, the lever accommodation and/or at least one part of the handlebar link. In particular, the components indicated above are integrally interconnected. These components, in particular, provide the base body, or they are at least parts of the base body. In particular, the base body may comprise further components which are integrally configured therewith.

In the scope of the present invention, particulars on relative positioning of components, in particular, relate to a mounting position as intended of the brake arrangement, and, in particular, to a transmitting unit mounted to a handlebar as intended. The term "fluid-tight", in particular, relates to the hydraulic fluid employed, under pressure conditions provided for operation.

It is possible for the cylinder housing to receive a bushing which is configured separate from the cylinder housing. Then, the piston unit is movably accommodated in the bushing. The bushing is, in particular, disposed (fastened) in, and enclosed by, the cylinder housing. The bushing can, in particular, only be inserted into the cylinder space through the connection port. The piston unit can, in particular, be inserted into the bushing only through the connection port. The bushing, in particular, does not close the connection port. The piston unit can, in particular, be mounted through the connection port when the bushing is already mounted. The piston unit can in particular, be demounted through the connection port when the bushing is mounted. The bushing, in particular, does not need to be demounted for disassembling the piston unit. The bushing, in particular, does not narrow the connection port so as to prohibit inserting the piston unit through the connection port. The bushing is, in particular, not longer than the cylinder housing (relative to the longitudinal axis). In addition, or alternately to the bushing, at least one coating may be configured in the cylinder space, improving, in particular, the friction properties and/or the wearing properties.

The brake arrangement comprises, in particular, at least one handlebar link for mounting the transmitting unit to a handlebar. The handlebar link is, in particular, integrally connected with the base body, at least in sections. The handlebar link comprises, in particular, at least two linking sections, which encircle at least part of the handlebar. In particular, at least a first of the at least two linking sections is integrally connected with the base body. At least one second of the at least two linking sections is, in particular, configured separate from the base body and can preferably be removably fastened to the base body (e.g. by screwing). Alternately, the handlebar link may be configured for mounting the transmitting unit directly on the handlebar (e.g. by screws or receivers/flanges laminated to the handlebar).

The second linking section may comprise at least two parts which are pivotally coupled to one another by means of a hinge. Each part is, in particular, fastened separately to the first linking section. A first part is, in particular, screwed to the first linking section by at least one first screw. A second part is, in particular, fastened to the first linking section by at least one second screw. Thus, the second screw is, in particular, hidden by the handlebar (and thus inaccessible), when the transmitting unit is mounted to the handlebar as intended. The second screw is, in particular, tightened before the transmitting unit is disposed on the handlebar. The first screw is, in particular, tightened after disposing and aligning the transmitting unit on or to the handlebar. Such a handlebar link offers many advantages and is particularly suitable for use with the integral base body presented herein.

Further advantages and features of the present invention can be taken from the exemplary embodiments which will be described below with reference to the enclosed figures.

DETAILED DESCRIPTION

Figure 1:
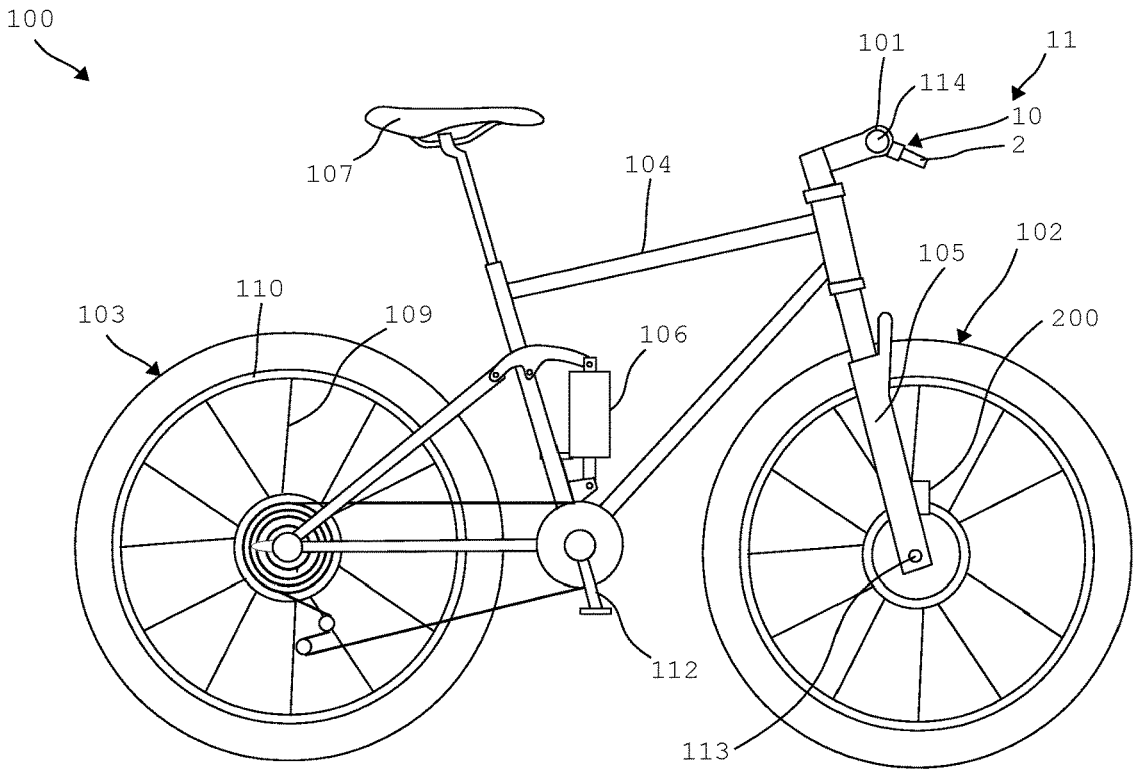
FIG. 1 a schematic illustration of a mountain bike with a brake arrangement according to the application.
Figure 2:
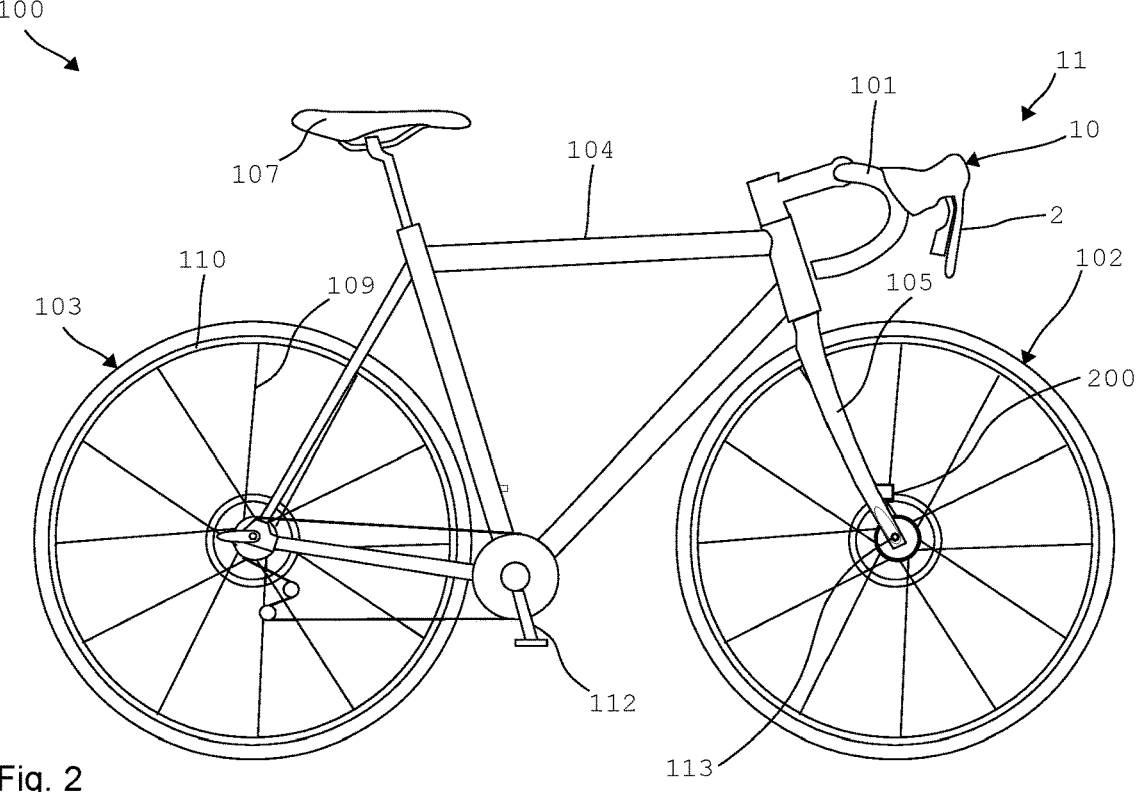
FIG. 2 a schematic illustration of a racing bicycle with a brake arrangement according to the application.
Figure 3:
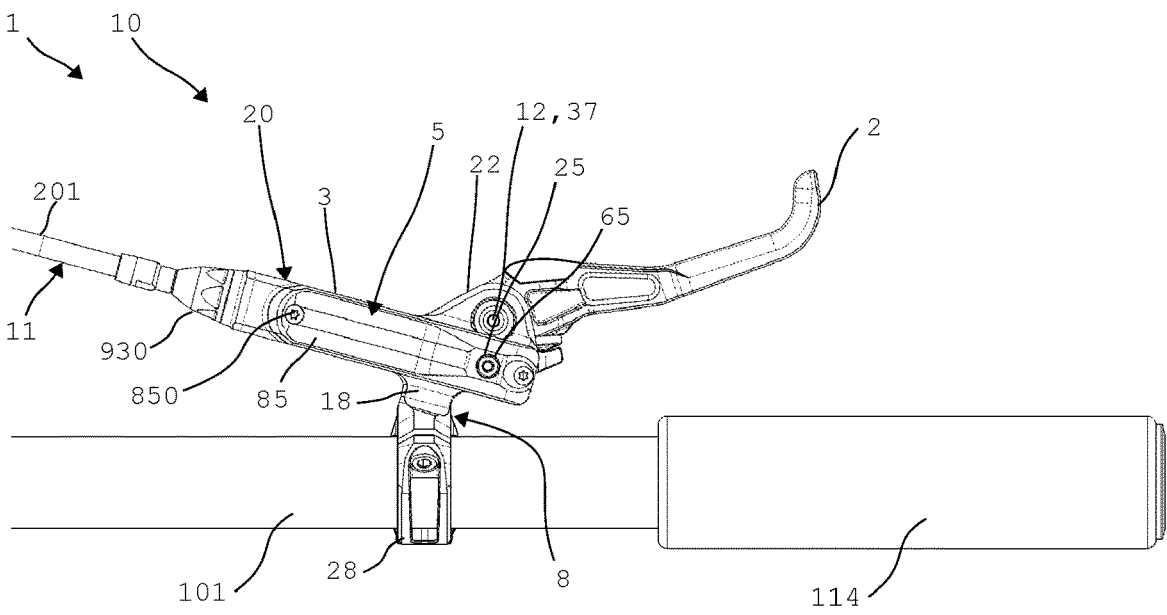
FIG. 3 a schematic illustration of a brake arrangement according to the application on the handlebar of a bicycle in a top view.
Figure 4:
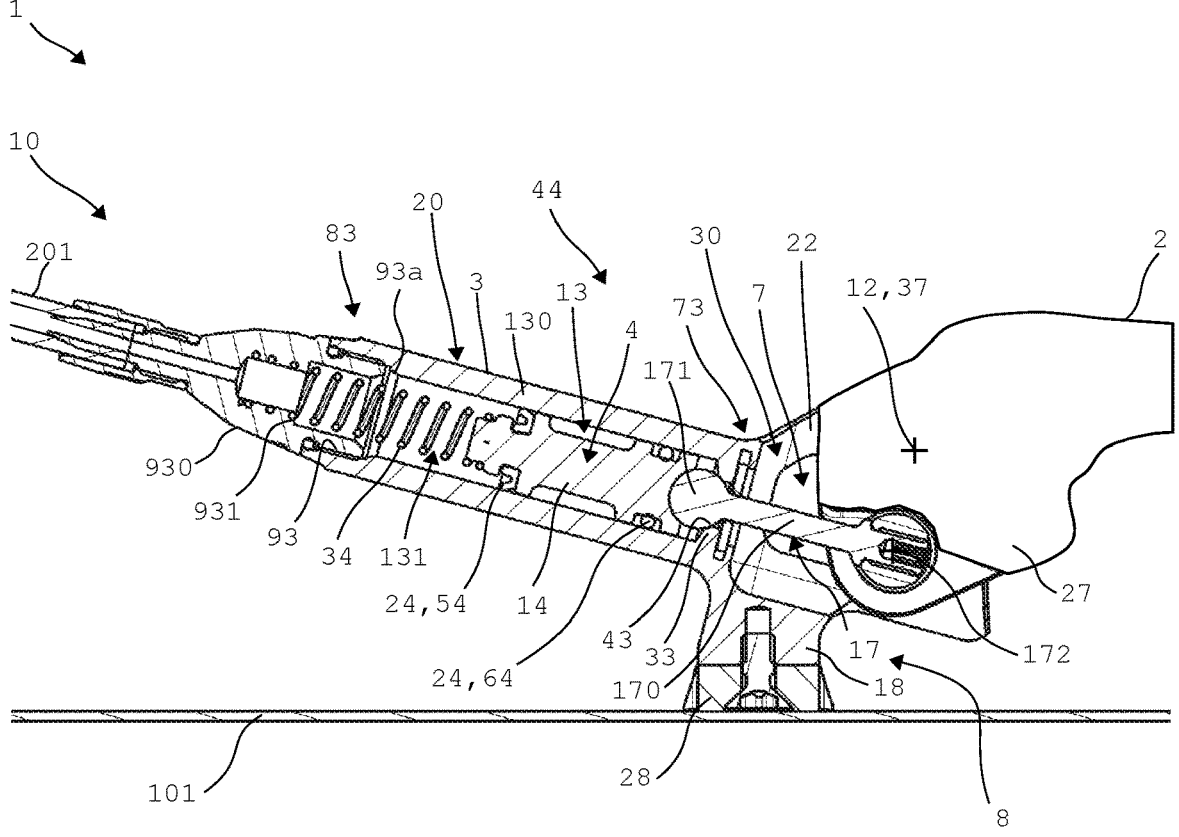
FIG. 4 the brake arrangement in an enlarged, sectional top view.
Figure 5:
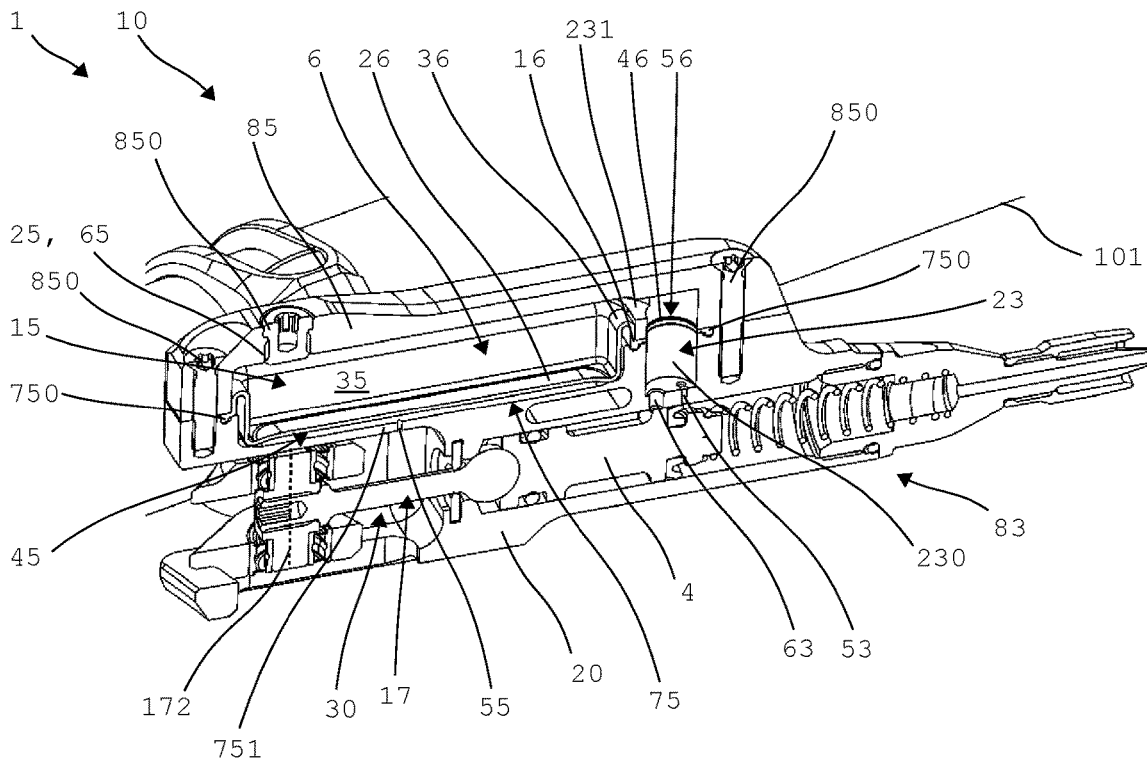
FIG. 5 the brake arrangement in a perspective side section view in the longitudinal direction, obliquely from above.

The FIGS. 1 and 2 illustrate bicycles 100 configured as a mountain bike respectively racing bicycle, each being equipped with a hydraulic brake arrangement 1 according to the application. The bicycles 100 are each provided with a front wheel 102 and a rear wheel 103, provided to be braked separately by means of separate hydraulic circuits 11. To this end, the hydraulic circuits 11 each comprise a transmitting unit 10 and a receiving unit 200.

A bicycle 100 comprises a frame 104, a handlebar 101 with grips 114, a saddle 107, a fork or suspension fork 105 and in the case of the mountain bike, a rear wheel damper 106 may be provided. A pedal crank 112 with pedals used for propelling the bicycle. Optionally, the pedal crank 112 and/or the wheels 102, 103 may be provided with an electrical auxiliary drive. The hubs of the wheels 102, 103 may each be attached to the frame 104 or the fork 105 by means of a clamping system 113 (for example a through axle or a quick release).

The frame 104 and the fork 105 each have a receiving unit 200 fastened thereto, presently configured as hydraulic disk brakes. The receiving unit 200 is connected with the associated transmitting unit 10 by means of a conduction device 201, not visible, such that a closed hydraulic circuit 11 results. The transmitting units 10 of a bicycle 100 are mounted to opposite ends of the handlebar 101, each showing a brake lever 2 provided for finger actuation. In the racing bicycle 100, the transmitting unit 10 is configured as a shifting-braking combination.

The brake arrangement 1 according to the application will now be described in detail with reference to the various illustrations of the FIGS. 3 to 11.

The brake arrangement 1 comprises a transmitting unit 10, which is connected via a conduction device 201 with a receiving unit 200, not shown, for example a disk brake. The transmitting unit 10 is fastened to the handlebar 101 of a bicycle 100, presently by means of a handlebar link 8, as has been described above.

This handlebar link 8 comprises two linking sections 18, 28. The first linking section 18 is an integral component of a base body 20. The second linking section 28 is screwed to the first linking section 18 and comprises two parts which are pivotally coupled to one another through a hinge.

The transmitting unit 10 comprises a cylinder housing 3 with a cylinder space 13 and a piston unit 4 displaceably received in the cylinder space 13. The cylinder housing 3 is also an integral component of the base body 20.

A brake lever 2, likewise integrated in the base body 20, is supported on a lever accommodation 22 so that said lever can pivot around a brake lever pivot axis 12. The brake lever 2 is coupled to the piston unit 4 by means of an actuating mechanism 7. Pulling the brake lever 2 causes displacement of the piston unit 4 in the cylinder space 13.

The actuating mechanism 7 comprises a connecting rod device 17 with a connecting rod 170 and a connecting rod small end 171, and a cam body 27. The cam body 27 is supported on the lever accommodation 22, such that it can pivot around a cam pivot axis 37. The brake lever pivot axis 12 and the cam pivot axis 37 are presently identical. The connecting rod device 17 is linked to the cam body 27 for pivoting around a connecting rod pivot axis 172. The cam body 27 is accommodated in a receiving space 30 of the base body 20. The cam body 27 is configured integrally with the brake lever 2.

The cylinder housing 3 comprises a lever-side end 73 and a receiver-side end 83. The receiving space 30 lies on a longitudinal axis shared with the cylinder space 13. On the receiver-side end 83, a connection port 93 is configured for coupling the conduction device 201. On the lever-side end 73, a connecting opening 43 is configured, through which the connecting rod 170 extends from the receiving space 30 into the cylinder space 13 to the piston unit 4. The connecting opening 43 is configured in a supporting wall 33, which is integrally connected with the cylinder housing 3.

The piston unit 4 comprises a piston 14 and a piston sealing device 24, which is provided by a primary sealing 54 and a secondary sealing 64. The piston unit 4 is shown in a rest position 44, since the transmitting unit 10 is not actuated. In the rest position 44, the connecting rod small end 171 bears against a contact portion 330 of the supporting wall 33 (see FIG. 11). Here, the piston unit 4 rests against the connecting rod small end 171 with its lever-side end.

A biasing member 34, configured as a spring, rests against the opposite end of the piston unit 4. The biasing member 34 is supported on a support structure 931 of a connecting unit 930. The connecting unit 930 is screwed into the receiver-side end 83 of the cylinder housing 3, such that the hydraulic fluid can only exit from the cylinder space 13 through the connecting unit 930 and the linked conduction device 201. Between the connecting unit 930 and the cylinder housing 3, a sealing 932 is disposed such that the screw thread is not necessarily required for sealing.

For storing hydraulic fluid, an equalizing reservoir device 5 with a tank space 15 is provided. The hydraulic fluid provided is presently a biologically decomposable oil. Alternately, mineral oil or brake fluid (DOT) may be provided. The equalizing reservoir device 5 comprises a tank trough 75 and a cover 85. The tank trough 75 is an integral component of the base body 20.

In the cover 85, a filling mouth 25 is provided, which doubles as a deaeration opening 65 for deaerating the hydraulic circuit 11 in the scope of maintenance work. The cover 85 of the equalizing reservoir device 5 is fastened to the tank trough 75 with two screws 850. For closing the filling mouth 25 or the deaeration opening 65, another screw 850 is provided.

In the tank space 15, a membrane unit 6 is disposed, subdividing the tank space 15 into a fluid space 35 for the hydraulic fluid and an air space 45. The membrane unit 6 seals the fluid space 35 from the air space 45.

The piston unit 4 and the cylinder housing 3 shown, limit a pressure space 131, which forms part of the cylinder space 13. The pressure space 131 is connected with the fluid space 35 through an equalizing hole 53 configured in a cylinder wall 130 of the cylinder housing 3. Merely exemplarily, the equalizing hole 53 consists of a total of three single holes. In the sectional view of the FIG. 5, the sectional plane extends through the central hole of the three holes.

The equalizing hole 53 is exposed when the piston unit 4 is in the rest position 44. When the transmitting unit 10 is actuated, the piston unit 4 seals the pressure space 131 against the fluid space 35 with its primary sealing 54. This applies pressure on the pressure space 131, when the brake lever 2 continues to be pulled. Then, the receiving unit 200 is actuated, and for example a piston of a disk brake is extended.

In addition to the equalizing hole 53, the cylinder space 13 is connected with the fluid space 35 through a lubrication hole 63. The lubrication hole 63 opens into a part of the cylinder space 13 lying outside of the pressure space 131. Through the lubrication hole 63, hydraulic fluid can flow behind the primary sealing 54, where it lubricates the piston unit 4. Moreover, the hydraulic fluid can return into the tank space 15 through the lubrication hole 63, when it has flowed behind the primary sealing 54. The lubrication hole 63 is sealed by means of the secondary sealing 64 against the connecting opening 43 and the receiving space 30 located behind.

The equalizing hole 53 and the lubrication hole 63 are parts of a duct connection 23 which connects the fluid space 35 with the cylinder space 13. The equalizing hole 53 and the lubrication hole 63 extend from a central duct 230 of the duct connection 230 into the cylinder space 15. The central duct 230 is connected with the fluid space 35 through a transverse duct 231 configured in the cover 85. The central duct 230 and the equalizing hole 53 and the lubrication hole 63 are configured in the base body 20.

The air space 45 is connected with atmosphere through a vent opening (and, in particular, e.g. a vent hole) 55. Thus, pressure changes are equalized, when the quantity of hydraulic fluid in the fluid space 35 increases or decreases, thus causing the membrane unit 6 to bulge upwardly respectively downwardly. The vent opening 55 shown is configured in the bottom 751 of the tank trough 75 and opens into the receiving space 30. Thus, the vent opening 55 is enclosed by the base body 20 in the region of its mouth and accommodated well protected in the receiving space 30.

In the transmitting unit 120 shown, an imaginary elongation of the longitudinal axis of the vent opening 55 intersects the connecting rod 170. Moreover, the connecting rod pivot axis 172 and the vent opening 55 extend in parallel to one another. The brake lever pivot axis 12 extends in parallel to the longitudinal axis of the vent opening 55. Moreover, the vent opening 55, the central of the three equalizing holes 53 and the lubrication hole 63 and the central duct 230, show longitudinal axes extending in parallel to one another. The equalizing reservoir device 5 and the cylinder space 13 show longitudinal axes extending in parallel to one another.

The membrane unit 6 is configured integrally, and comprises a tank sealing 16 and a membrane component 26 and a connection member 36, and a duct sealing 46. The membrane unit 6 is particularly clearly visible in the detail illustration of FIG. 9.

In a mounted state as intended, the tank sealing 16 extends between the tank trough 75 and the cover 85, such that these are mounted sealed to one another. The membrane component 26 is enclosed by the tank sealing 16 and is spread between the fluid space 35 and the air space 45.

The connection member 36 is configured arcuate and connects the membrane component 26 with the tank sealing 16. The connection member 36 biases the membrane component 26 in the region of a circumferential bottom edge against the bottom 751 of the tank trough 75 (see FIG. 8). In the region of the vent opening 55, the membrane component 26 is configured bulged, such that it is disposed spaced apart from the bottom 751.

The tank sealing 16 is accommodated in a receiving groove 750 of the tank trough 75. Since the tank trough 75 and the cover 85 are spaced apart in the region of the receiving groove 750, the tank sealing 16 cannot shear off even in the case of shocks acting on the cover 85. In the region of the duct sealing 46, the tank sealing 16 extends between the duct sealing 46 and the membrane component 26. Moreover, the base body 20 likewise has a receiving groove 750 in the region of the duct sealing 46 to prevent the duct sealing 46 from shearing off.

The duct sealing 46 seals the duct connection 23 against the cover 85 and the base body 20. Since the duct connection 23 shown, extends from the fluid space 35 through the cover 85 and further through the base body 20 to the cylinder space 13, the hydraulic fluid does not need to flow through the membrane component 26. The hydraulic fluid may pass the membrane unit 6 outside of the tank sealing 16.

To this end, the hydraulic fluid passes the membrane unit 6 through a through hole 56 configured in the duct sealing 46. This omits a passage in the membrane component 26, the sealing of which tends to be very complicated. Nevertheless, no additional sealing needs to be mounted, since the membrane unit 6 also provides for the duct sealing 46.

The air space 45 is configured beneath the fluid space 35. The filling mouth 25 opens directly into the fluid space 35, such that the membrane unit 6 does not need to be removed for filling up the hydraulic fluid. Since the filling mouth 24 is also configured as a deaeration opening 65, the membrane unit 6 is not required to be demounted for deaerating either.

Figure 7:
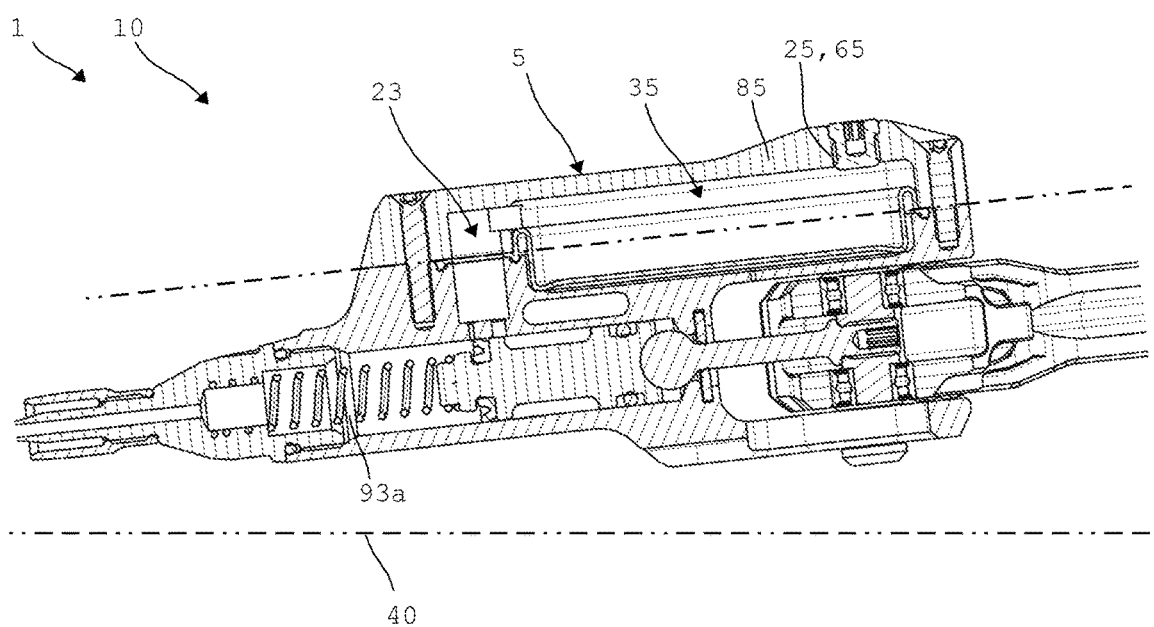
FIG. 7 the brake arrangement in a side section view in a mounted position as intended.
Figure 8:
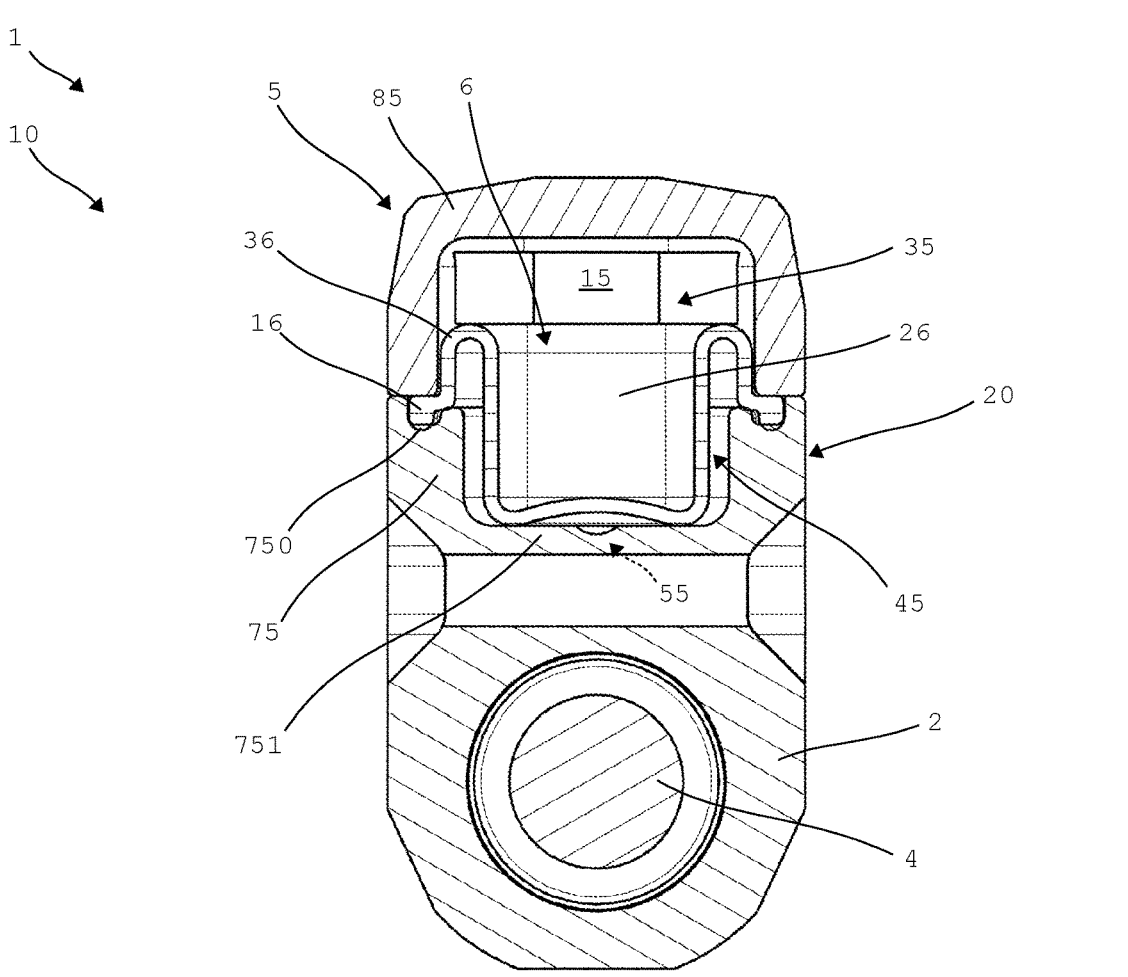
FIG. 8 a detail illustration of the brake arrangement sectioned transverse to the longitudinal direction in the region of the equalizing reservoir device.
Figure 9:
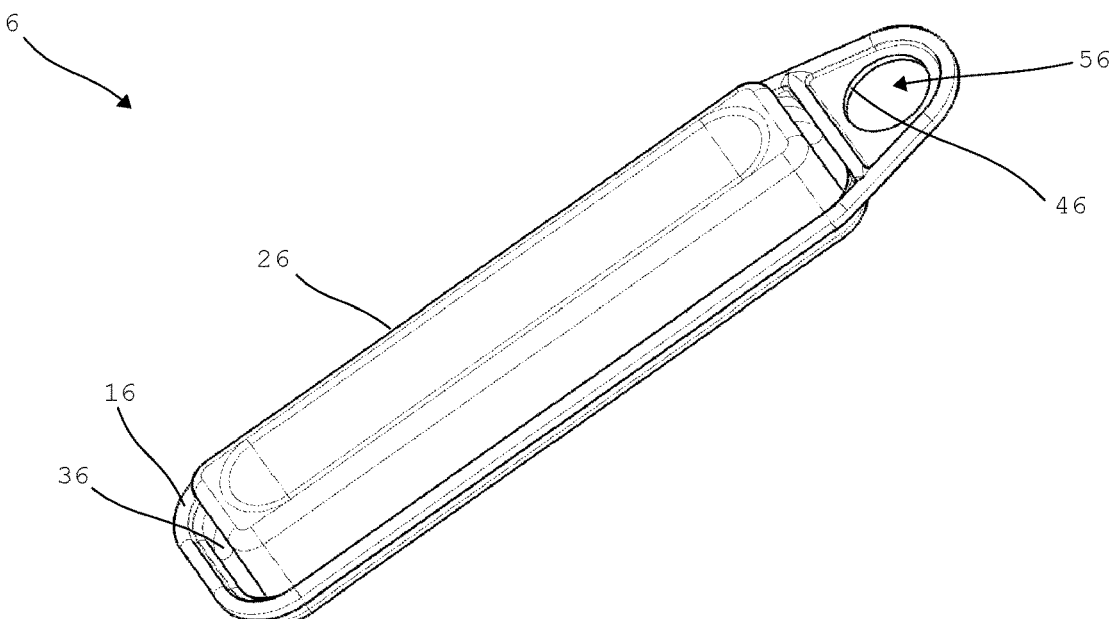
FIG. 9 a detail illustration of the membrane unit of the brake arrangement in a perspective view.

As can be clearly seen in the FIG. 7, the equalizing reservoir device (respectively the entire transmitting unit 10) has a longitudinal axis (drawn in a dash-dotted line in the FIG. 7) inclined to the horizontal 40 when the transmitting unit 10 is mounted to the handlebar 101 of the bicycle 100 as intended. Thus, the end portion of the equalizing reservoir device 5, on which the filling mouth 25 and the deaeration opening 65 are disposed, is positioned higher than the opposite end portion. Thus, the hydraulic fluid collects in the region of the duct connection 23, while any air possibly present in the fluid space 35 collects in the end portion with the filling mouth 25 respectively the deaeration opening 65. The duct connection 23 and the filling mouth 25 are disposed on end portions of the equalizing reservoir device 5 opposite each other in the longitudinal direction.

When manufacturing the brake arrangement 1 shown, the base body 20 is manufactured by selective material removal from a base body blank. This generates the base body 20 shown, in which the cylinder housing 3 with the cylinder space 13 and the supporting wall 33 and the contact portion 330, the lever accommodation 22 and the tank trough 75 of the equalizing reservoir device 5, and the receiving space 30 and the pertaining holes or ducts are fixedly incorporated.

After working out the cylinder space 13, the supporting wall 33 is readily accessible to tools, from the connection port 93. Thus, the contact surface 330 can be processed uncomplicated while highly precisely, working from the connection port 93. Before or after, the connecting opening 43 can also be manufactured through the connection port 93 or working from the receiving space 30. The equalizing hole 53 may be manufactured before or after manufacturing the contact portion 330.

Figure 6:
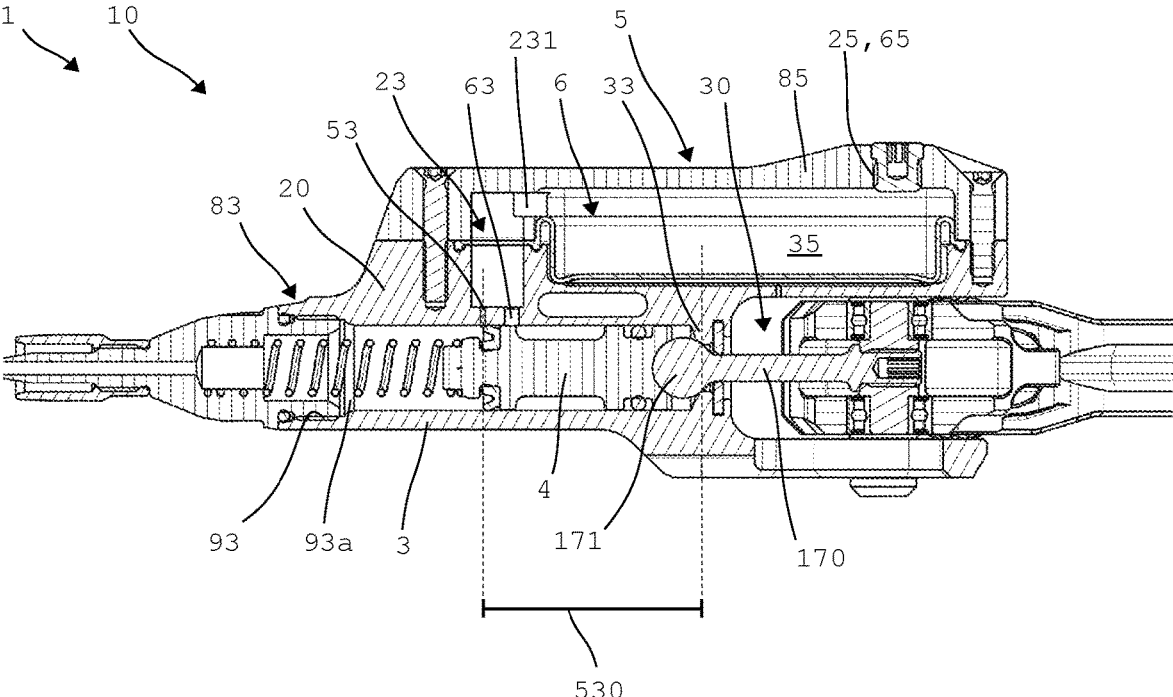
FIG. 6 the brake arrangement in a side section view.

In any case, the equalizing hole 53 and the contact portion 330 are incorporated in the base body 20 at defined distances 530 from one another (see FIG. 6). In the case that the cover 85 is not mounted yet, the equalizing hole 53 can be positioned in the base body 20 very uncomplicated and with high precision, such that the distance 530 observe particularly narrow tolerances. When the dimensions of the piston unit 4 and the connecting rod 17 are given, the dead travel is defined via the distance 530. Since the invention precisely observes the distance 530, the dead travel is also specified with particularly narrow tolerances.

After finishing the cylinder space 13, the piston unit 4 in the preassembled state (the piston 14 with the piston sealing device 24 mounted) is inserted into the cylinder space 13 through the connection port 93. The minimum diameter of the connection port 93 is matched to the maximum diameter of the cross sectional geometry of the piston unit 4. To protect the piston sealing device 24 when pushing in, the connection port 93 shown is provided with a chamfer 93a.

Firstly, the connecting rod device 17 is inserted into the cylinder space 13 through the connection port 93, with the connecting rod 170 leading. The connecting rod 171 is guided back out from the cylinder space 13 through the connecting opening 43, and connected with the cam body 27 in the receiving space 30.

On a side of the connecting opening 43 facing away from the cylinder space 13, a sealing groove 174 is incorporated into the base body 20. A sealing member 173 is inserted into the sealing groove 174, through which the connecting rod 170 extends. In this way, the cylinder space 13 is sealed from the receiving space 30.

Figure 10:
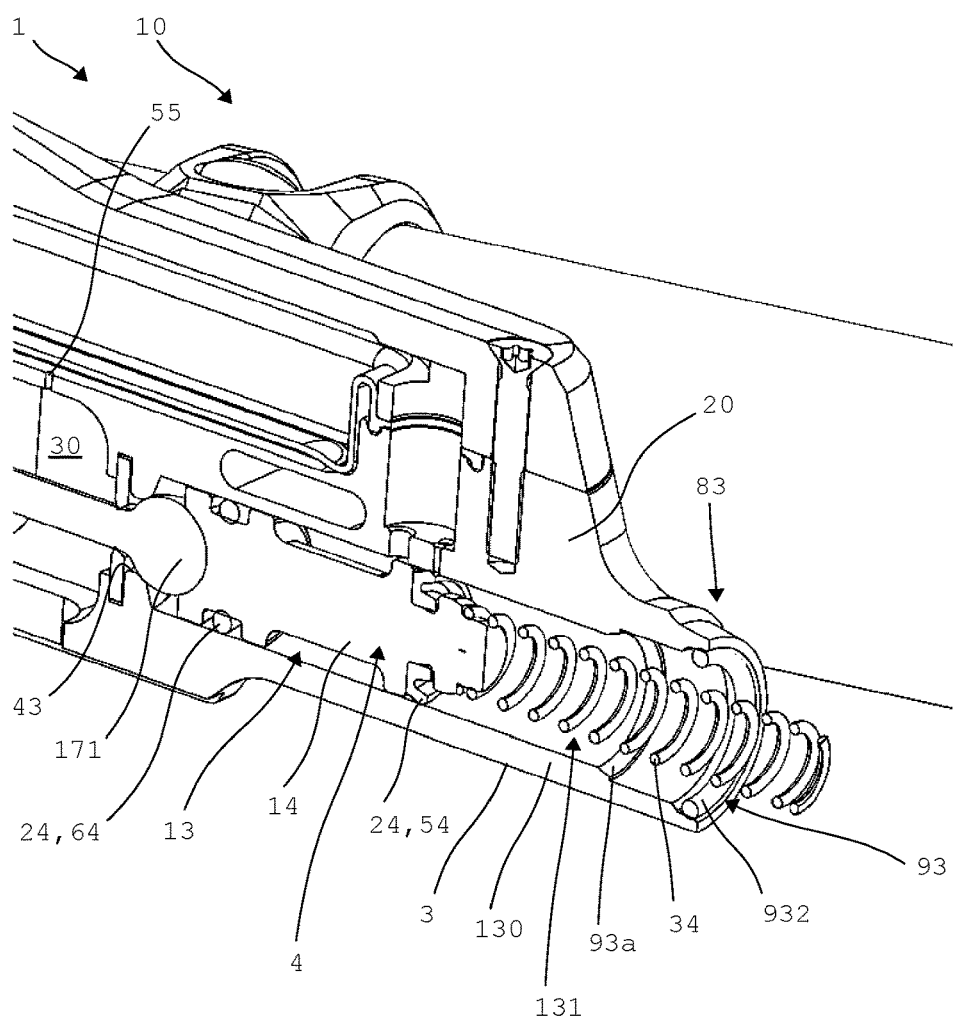
FIG. 10 a detail illustration of the brake arrangement in a sectioned, perspective side view, obliquely from the front.
Figure 11:
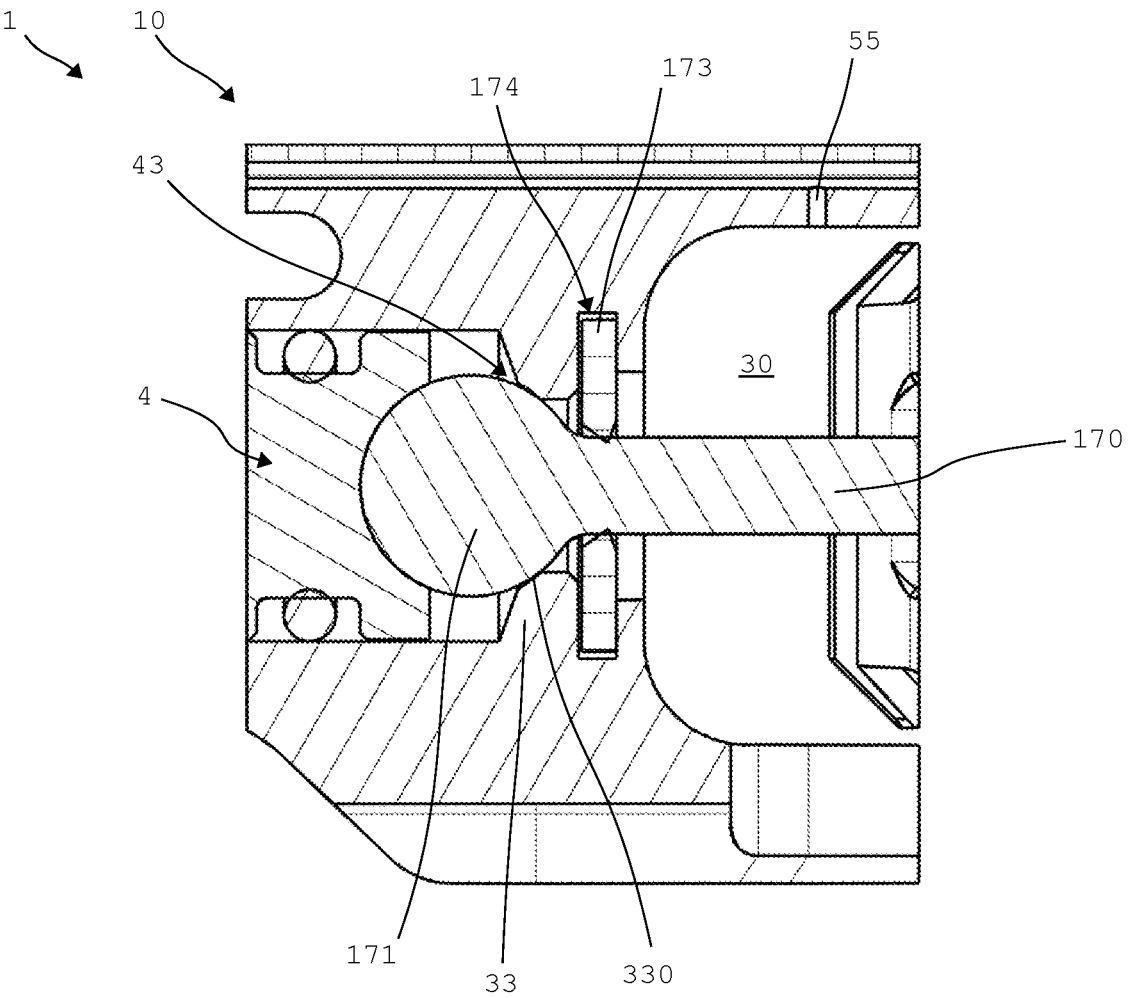
FIG. 11 an illustration of an enlarged detail of the FIG. 6.

After inserting the piston unit 4 in the cylinder space 13, the biasing member 34 is inserted through the connection port 93 (see FIG. 10). Thereafter, the connecting unit 930 is screwed in, so as to compress the biasing member 34. The biasing member 34 causes the piston unit 4 to be biased in the rest position 44 such that the connecting rod small end 171 is urged against the contact portion 330 of the supporting wall 33.

The transmitting unit 10 shown, due to its special structural assembly, allows exchanging the piston sealing device 24 respectively the piston 14 within a very short time, for practiced persons for example in less than one minute. To gain access to the piston unit 4, only the connecting unit 930 needs to be unscrewed. Since the piston unit 4 bears only loosely (biased) against the connecting rod device 17, the piston unit 4 can be pulled out of the cylinder space 13 quite simply through the connection port 93. After mounting for example a new primary sealing 54, the piston unit 4 can, again quite simply, be reinserted in the cylinder space 13.

After inserting the biasing member 34 and screw-fixing the connecting unit 930, the transmitting unit 10 is then completely installed again. Due to the distance 530 fixedly incorporated in the base body 20 and the supporting wall 33 with its contact portion 330 configured integrally in the base body 20, the dead travel is then automatically adjusted optimally. Subsequent filling up and deaerating the hydraulic circuit 11 can be done very simply and safely, due to the equalizing reservoir device 5 and the membrane unit 6 described above.

While a particular embodiment of the wheel component for an at least partially muscle-powered bicycle and method of manufacturing a brake arrangement have been described herein, it will be appreciated by those skilled in the art that changes and modifications may be made thereto without departing from the invention in its broader aspects and as set forth in the following claims.

| List of reference numerals: | |
| --- | --- |
| 1 | brake arrangement |
| 2 | brake lever |
| 3 | cylinder housing |
| 4 | piston unit |
| 5 | equalizing reservoir device |
| 6 | membrane unit |
| 7 | actuating mechanism |
| 8 | handlebar link |
| 10 | transmitting unit |
| 11 | hydraulic circuit |
| 12 | brake lever pivot axis |
| 13 | cylinder space |
| 14 | piston |
| 15 | tank space |
| 16 | tank sealing |
| 17 | connecting rod device |
| 18 | linking section |
| 20 | base body |
| 22 | lever accommodation |
| 23 | duct connection |
| 24 | piston sealing device |
| 25 | filling mouth |
| 26 | membrane component |
| 27 | cam body |
| 28 | linking section |
| 30 | receiving space |
| 33 | supporting wall |
| 34 | biasing member |
| 35 | fluid space |
| 36 | connecting member |
| 37 | cam pivot axis |
| 40 | horizontal |
| 43 | connecting opening |
| 44 | rest position |
| 45 | air space |
| 46 | duct sealing |
| 53 | equalizing hole |
| 54 | primary sealing |
| 55 | vent opening |
| 56 | through hole |
| 63 | lubrication hole |
| 64 | secondary sealing |
| 65 | deaeration opening |

-continued

| List of reference numerals: | |
|---|---|
| 73 | end |
| 75 | tank trough |
| 83 | end |
| 85 | cover |
| 93 | connection port |
| 93a | chamfer |
| 100 | bicycle |
| 101 | handlebar |
| 102 | wheel, front wheel |
| 103 | wheel, rear wheel |
| 104 | frame |
| 105 | fork, suspension fork |
| 106 | rear wheel damper |
| 107 | saddle |
| 109 | spoke |
| 110 | rim |
| 112 | pedal crank |
| 113 | clamping system |
| 114 | grip |
| 130 | cylinder wall |
| 131 | pressure space |
| 170 | connecting rod |
| 171 | connecting rod small end |
| 172 | connecting rod pivot axis |
| 173 | sealing member |
| 174 | sealing groove |
| 200 | receiving unit |
| 201 | conduction device |
| 230 | central duct |
| 231 | transverse duct |
| 330 | contact portion |
| 530 | distance |
| 750 | receiving groove |
| 751 | bottom |
| 850 | screw |
| 930 | connecting unit |
| 931 | support structure |
| 932 | seal |

The invention claimed is:

1. A hydraulic brake arrangement for an at least partially muscle-powered bicycle, comprising:

at least one transmitting unit provided for fluid connection with a receiving unit, wherein the receiving unit is a brake caliper of a disk brake; wherein the transmitting unit comprises a brake lever and a cylinder housing with a cylinder space; and a piston unit displaceably received in the cylinder space;

wherein the brake lever is operatively coupled with the piston unit via an actuating mechanism;

wherein the cylinder housing comprises a lever-side end and a receiver-side end; and wherein on the receiver-side end, a connection port is configured for coupling a conduction device, wherein the conduction device is a tubular hydraulic line, so that, when the brake lever is actuated, a hydraulic fluid is pressed by the piston unit from the cylinder space through the connection port and further along the hydraulic line to the disk brake, so that a piston of the disk brake is extended; and wherein on the lever-side end, a connecting opening is configured, through which the actuating mechanism extends into the cylinder space to the piston unit;

the connecting opening is configured in a supporting wall extending transverse to the longitudinal axis of the cylinder space and non-detachably connected with the cylinder housing; and the piston unit is provided to be inserted into the cylinder space through the connection port.

2. The brake arrangement according to claim 1, wherein the supporting wall limits the movability of the piston unit on the lever-side end, and in particular defines a rest position of the piston unit.

3. The brake arrangement according to claim 1, wherein the connection port has a minimum diameter which is larger than the maximum diameter of the cross sectional geometry of the piston unit.

4. The brake arrangement according to claim 1, wherein the connecting opening has a minimum diameter which is smaller than the maximum diameter of the cross sectional geometry of the piston unit, so that the piston unit cannot pass through the connecting opening.

5. The brake arrangement according to claim 1, wherein the connecting opening has a minimum diameter which is smaller than the maximum diameter of the cross sectional geometry of a part of the actuating mechanism lying inside of the cylinder housing.

6. The brake arrangement according to claim 1, wherein the piston unit is radially enclosed in the cylinder housing over its entire axial length.

7. The brake arrangement according to claim 1, wherein the brake lever is pivotally supported on a lever accommodation, and wherein the cylinder housing is integrally connected with the lever accommodation.

8. The brake arrangement according to claim 1, wherein at least one equalizing hole is disposed in the cylinder housing, and wherein the distance between the equalizing hole and the supporting wall is fixedly incorporated into the material of the cylinder housing.

9. The brake arrangement according to claim 1, wherein the actuating mechanism comprises at least one connecting rod device with a connecting rod and a connecting rod small end, and wherein the connecting rod extends through the connecting opening into the cylinder space, and wherein the connecting rod small end is disposed in the cylinder space between the supporting wall and the piston unit.

10. The brake arrangement according to claim 9, wherein the supporting wall comprises a contact portion that geometrically corresponds with the connecting rod small end, and wherein the contact portion is configured concave and the connecting rod small end, convex, at least in sections.

11. The brake arrangement according to claim 9, wherein the piston unit can be biased to a rest position by means of a biasing member, and wherein the biasing member urges the connecting rod small end against the supporting wall.

12. The brake arrangement according to claim 9, wherein the connecting rod is disposed outside of the cylinder space in a receiving space that is at least partially enclosed in a base body of the transmitting unit.

13. The brake arrangement according to claim 12, wherein the cylinder housing is an integral component of the base body of the transmitting unit.

14. The brake arrangement according to claim 13, wherein the cylinder space is provided by a recess in the base body.

15. The brake arrangement according to claim 9, wherein at least one sealing member is supported upstream of the connecting opening on its side facing away from the cylinder space, and wherein the connecting rod extends through the sealing member.

16. The brake arrangement according to claim 1, wherein the brake lever is pivotally supported for pivoting around a brake lever pivot axis, and wherein the brake lever pivot axis is disposed laterally adjacent an imaginary extension of the cylinder space.

17. The brake arrangement according to claim 1, wherein the connection port and the connecting opening and the cylinder space and the piston unit are disposed on a shared longitudinal axis.

18. The brake arrangement according to claim 1, wherein the connection port is provided to be coupled with a connecting unit for linking the conduction device, and wherein the connecting unit screws into the cylinder housing, and wherein the connection port is narrowed by the connecting unit only, so that the piston unit can no longer exit out of the cylinder space through the connection port.

19. The brake arrangement according to claim 18, wherein the connecting unit shows a support structure on which a biasing member is supported.

20. The method according to claim 18, wherein a biasing member is inserted through the connection port and is clamped between the connecting unit and the piston unit.

21. A method of manufacturing a hydraulic brake arrangement for an at least partially muscle-powered bicycle of claim 1, comprising: the at least one transmitting unit provided for fluid connection with the receiving unit; wherein the transmitting unit comprises the brake lever and the cylinder housing with the cylinder space and the piston unit displaceably received in the cylinder space; wherein the brake lever is operatively coupled with the piston unit by means of the actuating mechanism; wherein the cylinder housing comprises the lever-side end and the receiver-side end; and wherein the connection port for coupling a conduction device is configured on the receiver-side end; and wherein on the lever-side end, the connecting opening is configured, through which the actuating mechanism extends into the cylinder space to the piston unit; and the piston unit is inserted into the cylinder space through the connection port.

22. The method according to claim 21, wherein the connecting opening is manufactured by means of material removal from a supporting wall which extends transverse to the longitudinal axis of the cylinder space.

23. The method according to claim 21, wherein a connecting rod device with the connecting rod and a connecting rod small end is inserted through the connection port before the piston unit is, and wherein the thus inserted connecting rod is removed back out of the cylinder space through the connecting opening, while the connecting rod small end remains in the cylinder space.

24. The method according to claim 23, wherein a sealing groove, which is disposed on a side of the connecting opening facing away from the cylinder space, by means of material removal from a base body, and wherein the material is removed from a receiving space, in which the actuating mechanism is at least partially accommodated, and wherein at least one sealing member is inserted into the sealing groove, and wherein the connecting rod is guided through the sealing member.

25. The method according to claim 24, wherein an equalizing hole is incorporated into the base body at a defined distance from a contact portion of the supporting wall.

26. The method according to claim 21, wherein the cylinder space is manufactured by means of material removal from a base body of the transmitting unit, and wherein the material is removed from the receiver-side end in the direction to the lever-side end.

27. The method according to claim 21, wherein a contact portion is manufactured by means of material removal from the supporting wall, and wherein the material is removed from the receiver-side end through the connection port.

28. A hydraulic brake arrangement for an at least partially muscle-powered bicycle, comprising:

at least one transmitting unit provided for fluid connection with a receiving unit, wherein the transmitting unit comprises a brake lever and a cylinder housing with a cylinder space; and a piston unit displaceably received in the cylinder space;

wherein the brake lever is operatively coupled with the piston unit via an actuating mechanism;

wherein the cylinder housing comprises a lever-side end and a receiver-side end;

wherein on the receiver-side end, a connection port is configured for coupling a conduction device;

wherein on the lever-side end, a connecting opening is configured, through which the actuating mechanism extends into the cylinder space to the piston unit;

the connecting opening is configured in a supporting wall extending transverse to the longitudinal axis of the cylinder space and non-detachably connected with the cylinder housing;

the piston unit is provided to be inserted into the cylinder space through the connection port; and wherein the connecting opening has a minimum diameter which is smaller than the maximum diameter of the cross sectional geometry of a part of the actuating mechanism lying inside of the cylinder housing.

* * * * *